United States Patent
Seibt et al.

(10) Patent No.: US 10,017,968 B2
(45) Date of Patent: Jul. 10, 2018

(54) DOOR UNIT HAVING A DOOR OPENING MECHANISM

(71) Applicant: Airbus Operations GmbH, Hamburg (DE)

(72) Inventors: Christian Seibt, Hamburg (DE); Jens Wiebalck, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 56 days.

(21) Appl. No.: 14/689,330

(22) Filed: Apr. 17, 2015

(65) Prior Publication Data

US 2015/0300054 A1 Oct. 22, 2015

(30) Foreign Application Priority Data

Apr. 17, 2014 (DE) .................. 10 2014 105 566

(51) Int. Cl.
*E05B 81/78* (2014.01)
*B64C 1/14* (2006.01)
*B64D 11/02* (2006.01)

(52) U.S. Cl.
CPC ............ *E05B 81/78* (2013.01); *B64C 1/1407* (2013.01); *B64D 11/02* (2013.01)

(58) Field of Classification Search
CPC ..... E05B 81/78; B64C 1/1407; B64C 1/1415; B64C 1/1423; B64C 1/1469; B64D 11/02
See application file for complete search history.

(56) References Cited

U.S. PATENT DOCUMENTS

| 4,994,722 | A | 2/1991 | Dolan et al. | |
|---|---|---|---|---|
| 7,373,756 | B2 * | 5/2008 | Okulov | E05F 15/74 49/339 |
| 7,404,477 | B1 * | 7/2008 | Toennisson | B66B 29/005 198/323 |
| 8,888,045 | B2 * | 11/2014 | Boren | E05F 15/00 244/118.5 |

(Continued)

FOREIGN PATENT DOCUMENTS

| CA | 2627110 A1 * | 10/2009 | ............ E05B 17/22 |
|---|---|---|---|
| DE | 102009025079 A1 | 12/2010 | |

(Continued)

OTHER PUBLICATIONS

European Patent Office, European Search Report for European Patent Application No. 15163769.1 dated Aug. 20, 2015.

*Primary Examiner* — Brian M O'Hara
(74) *Attorney, Agent, or Firm* — Lorenz & Kopf, LLP

(57) ABSTRACT

A door unit for a lavatory facility on board an aircraft comprises a door element, a door frame, and a locking and release mechanism. By an articulated device the door element is held on the door frame so as to be movable between an open position and a closed position. The locking and release mechanism comprises a locking device and a release device. Further, by the locking device the door element can be locked in a closed position (PVER) in the door frame so that any opening of the door element from outside the lavatory facility is blocked. By the release device the locking device can be released. For releasing the locking device, the release device comprises a non-contacting sensor device that can be activated with a movement of the hand.

14 Claims, 8 Drawing Sheets

(56) References Cited

U.S. PATENT DOCUMENTS

2010/0253516 A1* 10/2010 Lemerand ............... E05F 15/70
340/545.1
2011/0080252 A1    4/2011  Ibsies
2012/0023824 A1    2/2012  Mason

FOREIGN PATENT DOCUMENTS

DE    102012104750 A1   12/2013
EP         1832508 A1    9/2007
WO       2014113154 A1    7/2014

* cited by examiner

DOOR UNIT HAVING A DOOR OPENING MECHANISM

CROSS-REFERENCE TO RELATED APPLICATION

This application claims priority to German Patent Application No. 10 2014 105 566.7 filed Apr. 17, 2014 which is incorporated herein by reference in its entirety.

TECHNICAL FIELD

The embodiments described herein relate to a door unit for a lavatory facility on board an aircraft, to a sanitary unit for a cabin of an aircraft, to an aircraft, to a method for opening a door unit for a lavatory facility, and to the use of a door unit in an aircraft.

BACKGROUND

Lavatory facilities are used, for example on board aircraft, e.g. airplanes, in order to make it possible for passengers and members of the crew to be able to use toilets while on board the aircraft. For example, in WO 2011/101385 A2 a WC unit is described in which several lavatory facilities have been arranged together. As a rule, there is also a wash basin arranged within a lavatory facility so that users can wash their hands after having used the toilet. In conjunction with preventing the outbreak of infectious diseases that can assume epidemic proportions, for example SARS or avian influenza, within a lavatory facility, furthermore, disinfectants are provided as a supplementary measure for disinfecting the hands. However, it has been shown that despite these measures, when users leave the lavatory facility they can have bacteria, viruses, germs or other pathogens on their hands.

In addition, other objects, desirable features and characteristics will become apparent from the subsequent summary and detailed description, and the appended claims, taken in conjunction with the accompanying drawings and this background.

SUMMARY

It is therefore an object of the present embodiments described herein to provide an option for improving the state of hygiene of users' hands.

This object is met by a door unit for a lavatory facility on board an aircraft, a sanitary unit for a cabin of an aircraft, an aircraft, a method for opening a door unit for a lavatory facility, and the use of a door unit in an aircraft in accordance with the claims provided herein.

According to an embodiment, a door unit for a lavatory facility on board an aircraft is provided. The door unit comprises a door element, and a locking and release device. By an articulated device, the door element is held on the door frame so as to be movable between an open position and a closed position. The locking and release mechanism comprises a locking device and a release device. By the locking device, the door element can be locked in a closed position in the door frame so that any opening of the door element from outside the lavatory facility is blocked. In other words, by the locking device the door element can be locked. By the release device, the locking device that is in the locked position can be released so that from the inside of the lavatory facility, the door element is pushable-open to the outside, i.e. can be pushed to the outside. For releasing the locking device, the release device comprises a non-contacting sensor device that is activatable, i.e. can be activated, with a movement of the hand.

This enables the user, after washing, and if applicable disinfecting his/her hands, to open the door without picking up pathogens or making contact with surfaces that potentially are contaminated with pathogens.

Apart from referring to movements of the actual hand of a user, the term "hand movement" or "movement of the hand" also refers to movement of the forearm or arm. The notion of "activatable with a movement of the hand" thus also includes activation of the sensor device with a movement of the arm or of the forearm.

In one example "movement of the hand" also refers to movement of some other body part, e.g. movement of the head or a foot or a leg, or movement of the upper arm or shoulder region of the passenger or user. For example, as an alternative or in addition to movement of the hand, the sensor device can also be activated by movement of some other body part.

In one example, the sensor device may be activated only with one or several predetermined i.e. specified movement/s in the form of a (specified) movement gesture.

The door unit can also be referred to as a door system. In the open position the door element is freely movable; in the closed position the door element keeps the door opening closed and held in the door frame in the closed position, e.g. by a (door) lock latch.

According to an embodiment, the door element is held in two stages by the locking and release mechanism. In a first stage, the door element is arranged in the closed position in the door frame. In the first stage, the door element is prevented from opening, with a first retention force. In a second stage, the door element is held in a slightly hinged-out position with a second retention force. In the slightly hinged-out position, on a side opposite the articulated device, the door element projects at least from the door frame so as to be visible from the outside and, visible from the inside, is visibly somewhat open compared to the closed position. In the second stage the door element is pushable-open by the user, i.e. the door element can be pushed open by the user.

The hinged-out position relates to a simplified solution of the locking and releasing of the door in terms of user friendliness. It is in particular suited for the situation when the user wants to a leave the lavatory. The release of the locking function may occur via a contactless sensor. The actual opening can then be performed by the user, e.g. via the abutment portions or surfaces provided for such purpose.

In an example, in the first stage the door element is held firmly against opening such that the door cannot be opened from the outside. Further, it may also be provided that the door is held to such an extent that a user leaning against the door on the inside, i.e. inside the lavatory, does not cause an unintended opening of the door. Hence, in an example, in the first stage the door is held in the closed position as is common to a lavatory door when being locked for the time of the use of the lavatory.

In an example, the door element is held in two stages by the locking and release mechanism. In a first stage the door element is arranged in the closed position in the door frame. In the first stage, the door element is held firmly and immovably against opening, with a first retention force. In a second stage, the door element is held in a slightly hinged-out position with a second retention force. In the slightly hinged-out position, on a side opposite the articulated device, the door element projects at least from the door frame so as to be visible from the outside and, visible from the inside, is visibly somewhat open compared to the closed position. In the second stage the door element is pushable-open by the user, i.e. the door element can be pushed open by the user.

With the two-stage holding, a possibility is provided of informing the user in a visual manner that the door i.e. the door element, after the sensor device has been activated and thus after the locking device has been released, is in a position in which the door element can be pushed open. At the same time it is possible from outside the lavatory facility, in particular in confined aisle regions, to provide other passengers in a visual manner with information to the effect that the door is no longer in the locked position, but instead that it can be expected that a user arranged inside the lavatory facility can push the door open.

The second stage represents an opening state of the door as an intermediate opening position or intermediate opening stage. The second stage is thus an intermediate state of the door, in addition to the closed state and the opened state. The intermediate stage is given and determined by the two-stage holding manner of the locking and release mechanism.

Holding the door in the second stage ensures that the door after having been unlocked does not open immediately, in which case it would swing into a passage or aisle region in front of the lavatory facility, but instead that the door is held in the second position so as to prevent autonomous movement.

In the first stage the door element can, for example, be held against any opening from outside the lavatory facility, wherein opening from inside the lavatory facility is possible, for example in panic situations or emergency situations. In one example, the first stage prevents opening of the door element from both sides, i.e. locking is effective from both sides.

Pushing the door open can take place, for example, manually or with the shoulder or some other body part, e.g. also with a foot or an angled arm (elbow).

In one variant, a door moving device is provided by which, when the locking device is in the released state, the door element is moved from the closed position to the slightly hinged-out position.

In another example, with the locking device released, the door element can be opened without actuation, hence is openable without actuation. For example, a door drive is provided that opens the door element, e.g. depending on a gesture-like movement of the hand.

In a further example the sensor device is of a two-stage design, and when the second stage is activated, the door moving device moves the door element from the slightly hinged-out position to the open position.

The second retention force keeps the door element in the slightly hinged-out position at least in such a manner that the door element does not move of its own accord, i.e. the door element is held so as to prevent any movement as a result of, for example, gravity or inclination (of the entire aircraft and thus also of the cabin) or movement of air inside the cabin region etc. In one example, the second retention force is smaller than the first retention force.

The slightly hinged-out position can also be referred to as interim position. The open position, in which the door element is open and is freely movable, can also be referred to as third stage. The locking and release mechanism would then be referred to as being of a three-stage design.

According to one example, the slightly hinged-out position is a position of the door, in which the door projects at least by half of the thickness of the door leaf. This allows an easy visible recognition if the door is opened in the intermediate state.

In an example, the door projects by the thickness of the door leaf. Hence, the door is clearly visible to be not closed, but also does not mean any obstacle e.g. in particular in narrow corridor spaces on board an aircraft.

According to another embodiment, in the slightly hinged-out position, the door is opened to such a degree that a gap is provided between the door leaf and a door frame portion, wherein the gap allows a transmission of light between inside and outside the lavatory.

The transmission of light can be used for example in narrow corridors of an aircraft where light from inside the lavatory that shines through the gap such that passengers present in the corridor are made aware of the door in the intermediate opened state, The gap may not be wider than approximately 5 cm (centimeters). For example, the gap may be 1 cm and 3 cm.

The term "approximately" relates to a deviation of maximum +/−25%, e.g. +1-15% or +/−10%.

According to another embodiment, the door element in the closed position is held against a hinge-out force that has been produced in the closing process. For example, a spring element or compression element is provided that, when the door element is being closed, is compressed, thus producing the hinge-out force. With the locking device released, the hinge-out force supports, for example, movement of the door element from the closed position in the first stage to the slightly hinged-out position in the second stage. The spring element or compression element can, for example, be arranged in the door rebate in the region of the articulated device.

According to a further embodiment, with the locking device released, the hinge-out force moves the door element from the closed position to the slightly hinged-out position, in which the door element is held and the door element can be pushed open by the user.

According to a further embodiment, a door closing device is provided that pushes the door element with a closing force from the open position to the slightly hinged-out position. For manual opening, the closing force can be overcome by the user.

The door closing device causes autonomous closing of the open door, but only to the slightly hinged-out position. When leaving the lavatory facility, the user can thus push the door open in order to leave the room (through the door). Subsequently, the door closing device causes the door element to automatically close, but only to the slightly hinged-out position rather than to the closed position. Thus, when a user has left the lavatory facility, the door is arranged in the slightly hinged-out position so that other passengers or other users can easily recognize that the lavatory facility is unoccupied, because the door is not in the closed and locked position.

The term "manual" refers to the opening force being provided by the user; it includes providing the force with the hands or with other body parts. However, manual opening preferably takes place with the use of the arm of the user or with the use of a shoulder region (upper body region). The manual opening can also take place with the use of a foot, a knee or some other leg region of the user.

According to one example, the sensor device is arranged on the door element in proximity to a door handle. The term "in proximity to" refers to a region within the region that can be reached by the hand when the user holds the door handle in his/her hand. The term "in proximity to" refers, for example, to a region of up to approximately 50 cm around the door handle. In another example, the sensor is arranged in a region of approximately 15 to 30 cm from the door handle.

In another example, the sensor device is provided beside the door element on the frame or on the adjoining wall surface. Arranging the sensor in proximity to the door handle allows intuitive operation. According to one example, the sensor device is arranged on the wall element beside the door element.

The sensor device is, for example, arranged in the region of an adjoining corner of the lavatory facility. The arrangement in a corner region is useful, for example, in the case of particularly confined lavatory facilities in order to prevent any unintended triggering, i.e. releasing, of the locking mechanism by the user moving inside the lavatory facility.

According to a further example, push-open regions are provided on the door element, by way of which push-open regions the user can produce a force for opening the door element. The push-open regions are visually distinguished relative to the remaining regions.

For example, a foot contact area may be provided in the lower region of the door element and is marked by a corresponding foot icon or shoe icon. In another example, as an alternative or in addition, a shoulder/elbow/forearm contact area may be provided in the upper region of the door element. For example, by a pictogram it is possible to point out the purpose of this area so that users can open the door even more intuitively without their hands touching the door.

According to a further embodiment, a horizontally extending handrail guidance device is provided on the door element, and the sensor device is arranged in the handrail guidance device. For example, the handrail, guidance device can be provided so as to be circumferential, or at least essentially circumferential, inside the entire lavatory facility, and can be used so that in this region all the operating elements for the functions inside the lavatory facility are arranged.

According to a further embodiment, a sanitary unit for a cabin of an aircraft is provided. The sanitary unit comprises at least one lavatory facility and a wall structure that at least partly encloses the lavatory facility, an access door in the wall structure, and a toilet inside the lavatory facility. The access door is designed as a door unit according to one of the preceding examples.

According to a further embodiment, an aircraft is provided that comprises a fuselage structure and a cabin region arranged in the fuselage structure. The cabin region comprises at least one sanitary area with at least one sanitary unit with a lavatory facility. The at least one sanitary unit is designed as a sanitary unit according to the preceding example.

The aircraft is for example an airplane, in particular a passenger airplane. The aircraft may also be a helicopter or an airship.

According to a further embodiment, a method for opening a door unit for a lavatory facility is provided. The door unit comprises a door element, a door frame and a locking and release mechanism. The door element is movably held on the door frame between an open position and a closed position by an articulated device. The locking and release mechanism comprises a locking device and a release device. By the locking device, the door element can be locked in a locked position in the door frame so that any opening of the door element from outside the lavatory facility is blocked. By the release device, the locking device that is in the locked position can be released so that, from inside the lavatory facility, the door element can be pushed to the outside. The method comprises the following steps: a) activating a non-contacting sensor device with a movement of the hand; b) activating the release device by the sensor device, and releasing the locking device; and c) pushing the door element open by the user.

According to a further embodiment, the use of a door unit according to one of the examples mentioned above in an aircraft is provided.

According to a further embodiment, a sensor is provided that can be activated in a non-contacting manner so as to release the locking device of the toilet door. In this manner, users having cleaned their hands are provided with the opportunity of leaving the lavatory facility without their hands again contacting potentially contaminated surfaces. In particular, users are provided with the opportunity to unlock and open the door without having to touch a handle or the like. In this manner, an additional measure of improving the hygiene on board an aircraft is ensured.

It should be pointed out that characteristics of the exemplary embodiments of the various devices also apply to embodiments of the method and to the use of the device, and vice versa. Furthermore, it is also possible to freely combine those characteristics where this is not explicitly stated.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Figure 1A:
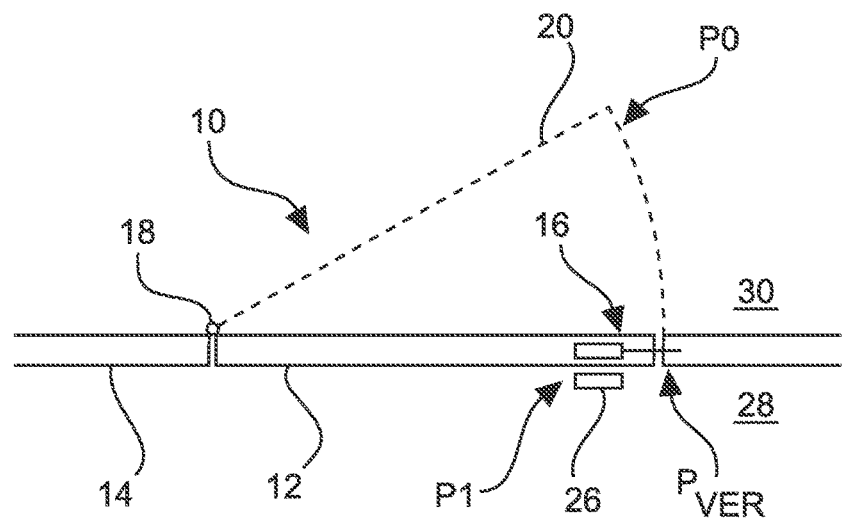
FIG. 1A shows a first example of a door unit in a diagrammatic horizontal section.

FIG. 1A shows a horizontal section of a door unit for a lavatory facility on board an aircraft.

Figure 1B:
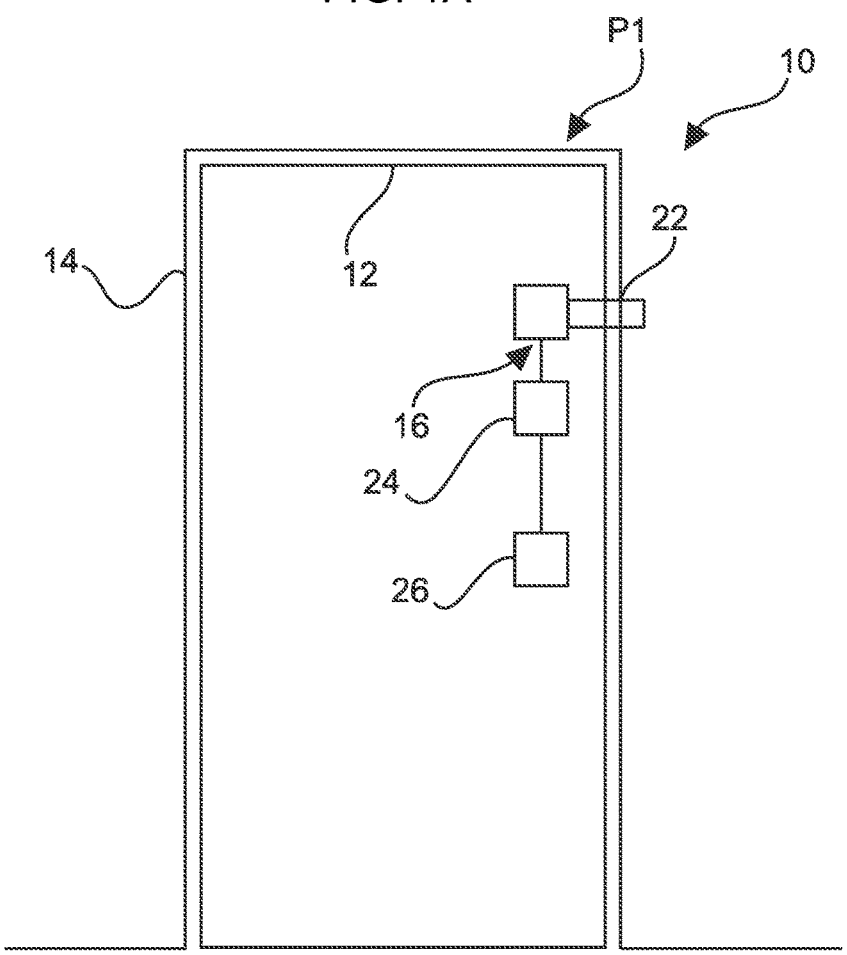
FIG. 1B shows the door unit in a diagrammatic interior view.

FIG. 1B shows a view of the door unit 10 from the interior of the lavatory facility. The door unit 10 comprises a door element 12 and a door frame 14. Furthermore, a locking and release mechanism 16 is provided. By an articulated device 18, the door element 12 is held on the door frame 14 so as to be movable between an open position PO and a closed position P1. In FIG. 1A and also in FIG. 1B, the door element is shown in the closed position. In FIG. 1A, the open position is indicated by a dashed line 20. The locking and release mechanism 16 comprises a locking device 22 and a release device 24. By the locking device 22 the door element 12 can be locked in a locked position $P_{VER}$ in the door frame 14 so that opening the door element 12 from outside the lavatory facility is blocked. By the release device 24, the locking device 22 that is in the locked position $P_{VER}$ can be released so that the door element 12 can be pushed from inside the lavatory facility to the outside, which will be explained in further detail in particular in the context of FIG. 5A and following.

For releasing the locking device 22, the release device 24 comprises a non-contacting sensor device 26 that can be activated with a movement of the hand.

For activating the locking device, i.e. for releasing the locking device, an actuating mechanism is provided, e.g. an actuator.

In addition it can also be provided that apart from releasing the locking device, releasing the door can also take place, e.g. an actuator that not only acts on the door lock but also releases the door latch. For example, an actuator can act on a door handle (not shown in further detail) so that the door can be opened.

In FIG. 1A, for example, a lavatory facility 28 is provided, in the drawing shown underneath the door element 12 or door frame 14, and an aisle or corridor region 30 shown above the door element 12 or door frame 14. In FIG. 1B, the direction of view is, for example, from the lavatory facility 28.

Figure 2A:
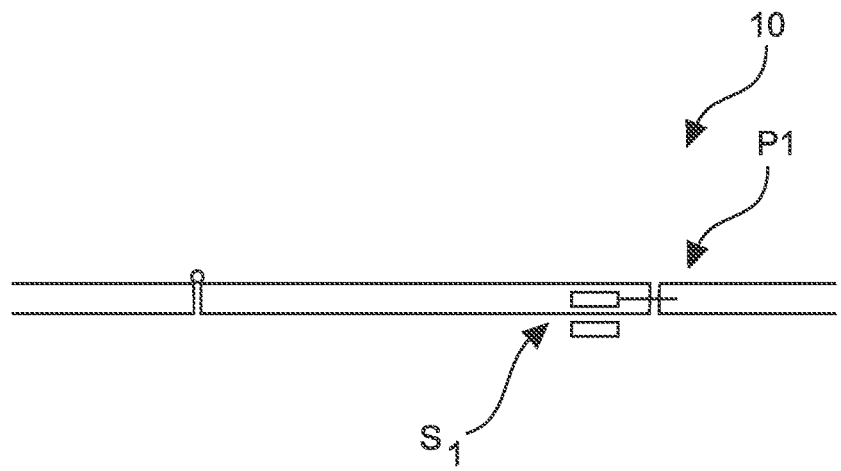
FIG. 2A shows an example of a door unit with a two-stage holding mechanism in a first stage in a closed position of the door element.
Figure 2B:
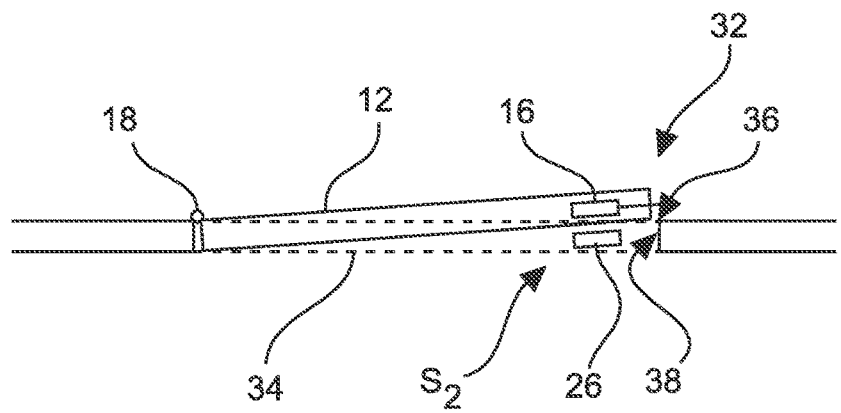
FIG. 2B shows a second stage in a slightly hinged-out position of the door element.
Figure 2C:
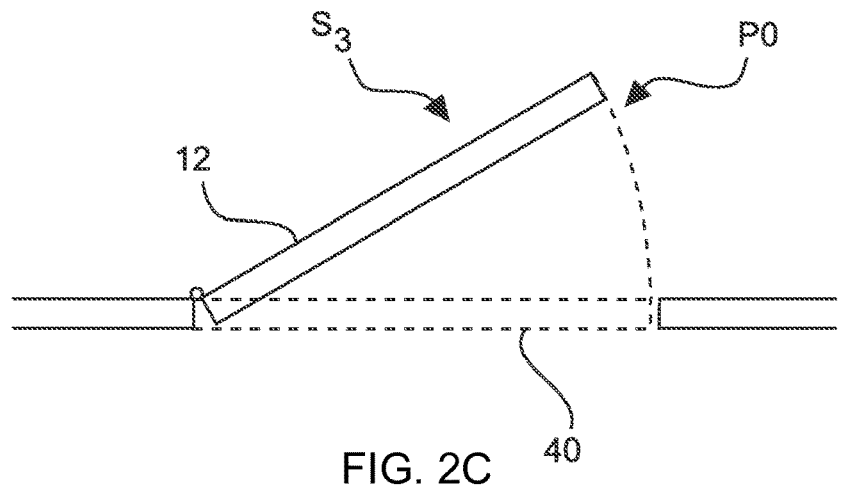
FIG. 2C. shows an open position of the door in FIG. 2A.

In FIG. 2A, FIG. 2B and FIG. 2C, a further embodiment of the door unit 10 is shown, in which the door element 12 is held in a two-stage manner by the locking and release mechanism 16. In a first stage S1, the door element 12 is arranged in the closed position P1 in the door frame 14. In the first stage S1, the door element 12 is held firmly and immovably against opening, with a first retention force, for example against opening from outside the lavatory facility. The first stage S1 with the closed position of the door element 12 is shown in FIG. 2A.

In a second stage S2, the door element 12 is held in a slightly hinged-out position with a second retention force. In the slightly hinged-out position, on a side 32 opposite the articulated device 18, the door element 12 projects from the door frame 14 at least to the extent that it is visible. In the second stage S2, the door element 12 can be pushed open by the user.

In FIG. 2B, the dotted lines 34 show the closed position of the first stage S1 of the door element 12, and the solid lines show the slightly hinged-out position in the second stage S2 of the door element 12.

In FIG. 2B, the visibly protruding part of the door element 12 is indicated by an arrow 36.

As a counterpart to the slightly hinged-out position visible from the outside, from the inside of the lavatory facility, too, it is visible to the user, for example by the recess 38, that the door element 12 can now be opened.

For the sake of completeness, in FIG. 2C, the open position PO of the door element 12 is also shown, wherein the door element 12 can be freely moved in the open position PO. In addition, the closed position in the first stage S1 of the door element 12 is shown in dotted lines 40.

The open position PO can also be referred to as the third stage S3, and consequently the locking and release mechanism 16 is of a three-stage design.

Figure 3A:
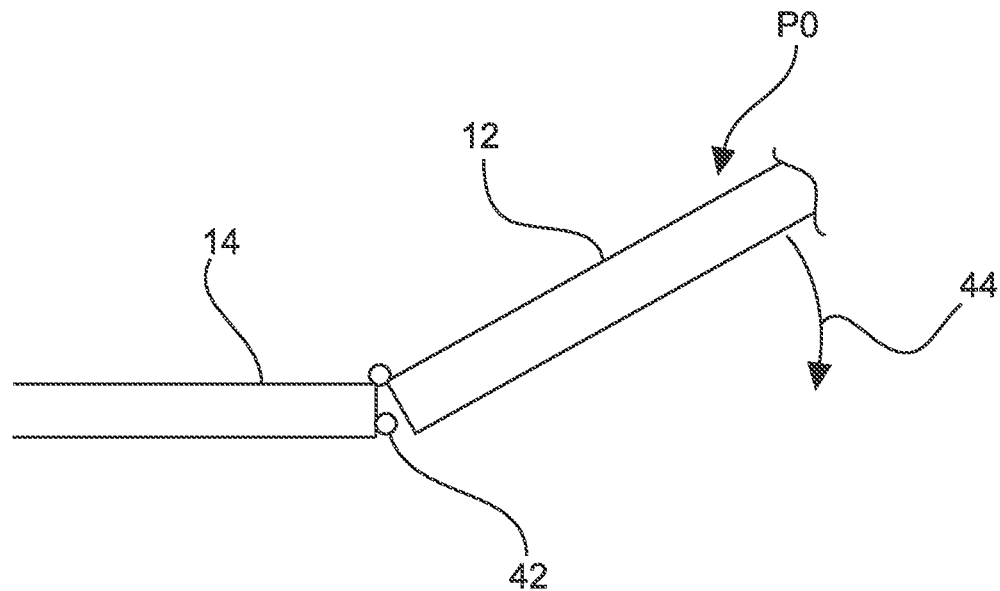
FIG. 3A shows a section of a horizontal section of a further example with a device for producing a hinge-out force.
Figure 3B:
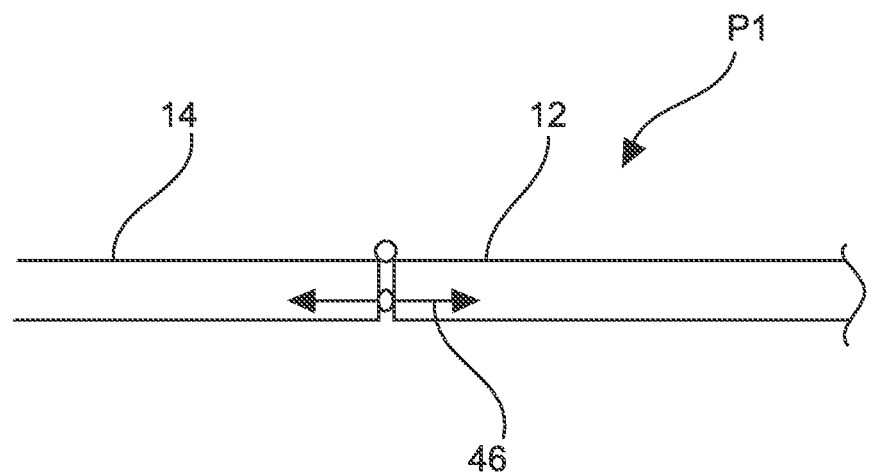
FIG. 3B shows a closed position of the door element in FIG. 3A.

FIGS. 3A and 3B show a further embodiment, in that, in the closed position P1, the door element 12 is held against a hinge-out force that has been produced as a result of the closing process. In FIG. 3A, the door element 12 is shown in the open position PO, and in FIG. 3B in the closed position P1. For example, an elastic spring element or compression element 42 is provided that, when the door element 12 is being closed, is compressed, thus producing the hinge-out force. In FIG. 3A, a first arrow 44 indicates the closing process, and in FIG. 3B two smaller arrows 46 indicate that the compressed compression element 42 acts with a force on the two adjoining elements, i.e. the door element 12 and the door frame 14, thus producing the hinge-out force.

With the locking device released, the hinge-out force causes, for example, movement of the door element 12 from the closed position P1 to the slightly hinged-out position, in which the door element 12 is held and in which the door element 12 can be pushed open by the user.

Figure 4A:
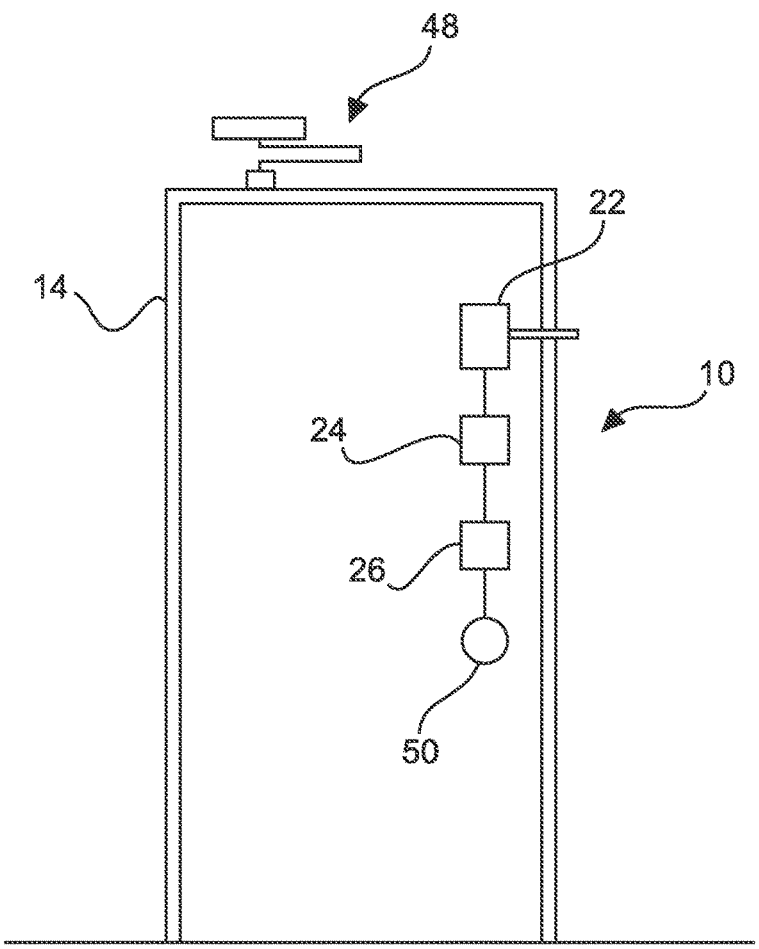
FIG. 4A shows a door unit with a door closing device in a further example in FIG. 4A in a projection view.

In FIG. 4A, a further example is shown, in which a door closing device 48 is provided that pushes the door element 12 with a closing force from the open position to the slightly hinged-out position, wherein for manual opening the closing force can be overcome by the user. In FIG. 4A, for example, an interior view of the door unit 10 is shown, wherein, for example, the locking device 22 and the release device 24 are provided above a door handle 50.

According to a further embodiment, shown as an option in FIG. 4A, the sensor device 26 is arranged in proximity to a door handle, for example the door handle 50. The arrangement in proximity to the door handle can also be provided without the provision of a door closing device.

Figure 4B:
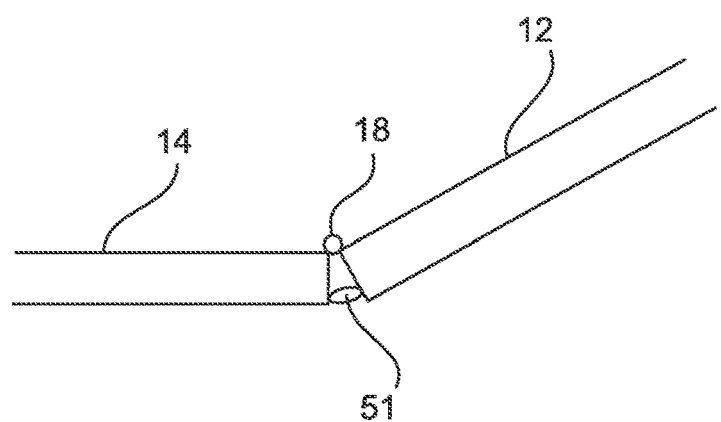
FIG. 4B shows a door unit diagrammatic horizontal section view.

In FIG. 4B, in a diagrammatic horizontal section yet another example is shown, in which a door closing device 51 is provided that is accommodated in the region of the door rebate on the articulated device 18. The door closing device 51 is, for example, an elastic element that is arranged between the door element 12 and the door frame 14 and that is connected to both of them. When the door is opened the elastic element is elongated, and consequently a restoring force is produced, and thus a closing force, by which the door is pulled from the open position back to the slightly hinged-out position.

The elastic element can, for example, produce not only the hinge-out force but also the closing force. The elastic element can, for example, be designed and dimensioned in such a manner that in the slightly hinged-out position it is in the neutral state, in other words neither elongated nor compressed.

Figure 5A:
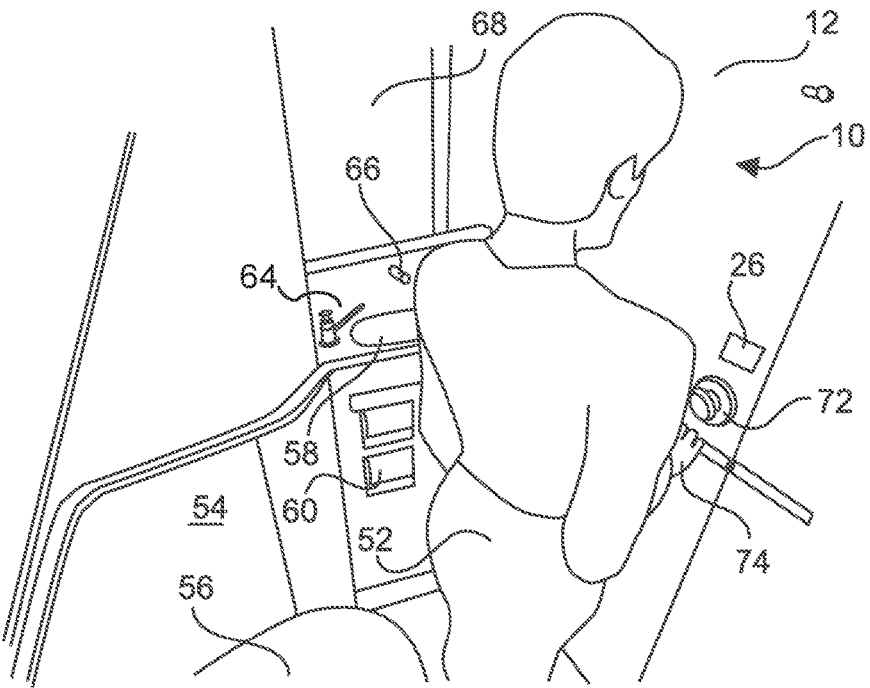
FIG. 5A shows perspective views from the interior to explain an exemplary usage sequence with a diagrammatically shown person in front of the door unit with the door element in the closed position; at the beginning of the push-open process for example with the elbow in FIGS. 5C and 5D; and a perspective view of the state of FIG. 5B without the person.

In FIG. 5A, a perspective view from the interior is shown, wherein for the purpose of elucidating the function of the door unit 10, a person 52 is diagrammatically indicated. FIG. 5A shows an interior 54 of a lavatory facility, which interior 54 apart from a toilet 56 also comprises a wash basin 58 and the associated service devices, for example a toilet paper holder 60, a soap dispenser 64, a faucet 66 or a mirror 68.

The door element 12 comprises, for example, a handle device 72 and also the non-contacting sensor device 26, which is provided in proximity to the door handle.

After the process of washing their hands, the person turns towards the door and remotely activates the sensor device 26, for example with one hand 74, wherein there is no need to touch the sensor device, which is a proximity sensor. Thereafter the sensor device 26 activates the release device 24, by which the locking device 22 is released so that the door element 12 can be pushed open.

Figure 5B:
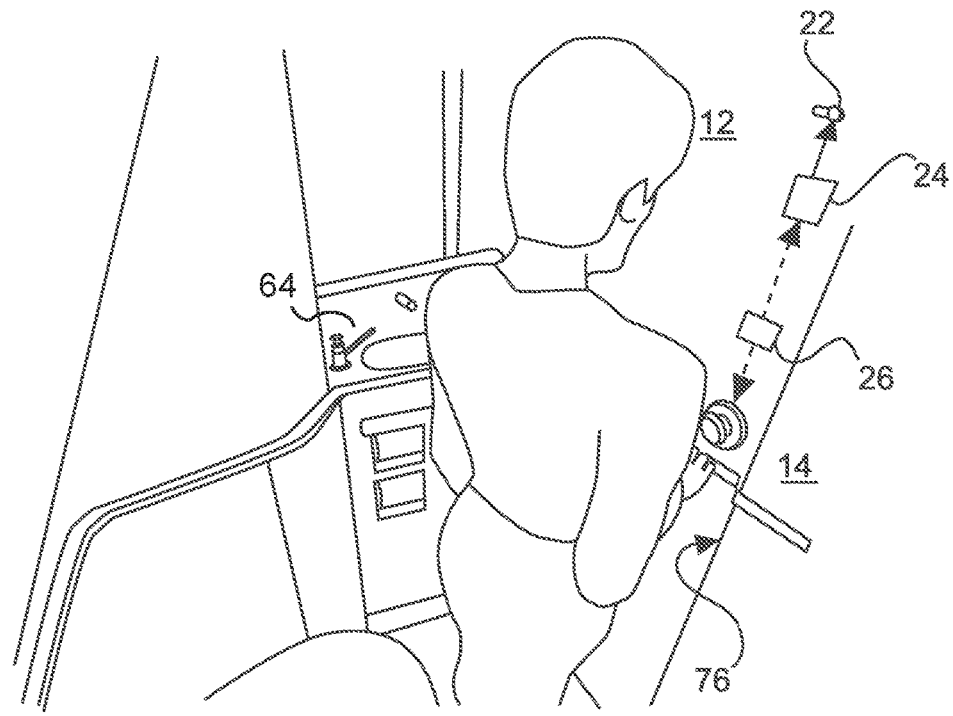
FIG. 5B shows a door element in the slightly hinged-out position, i.e. after activation of the non-contacting sensor device.
Figure 5C:
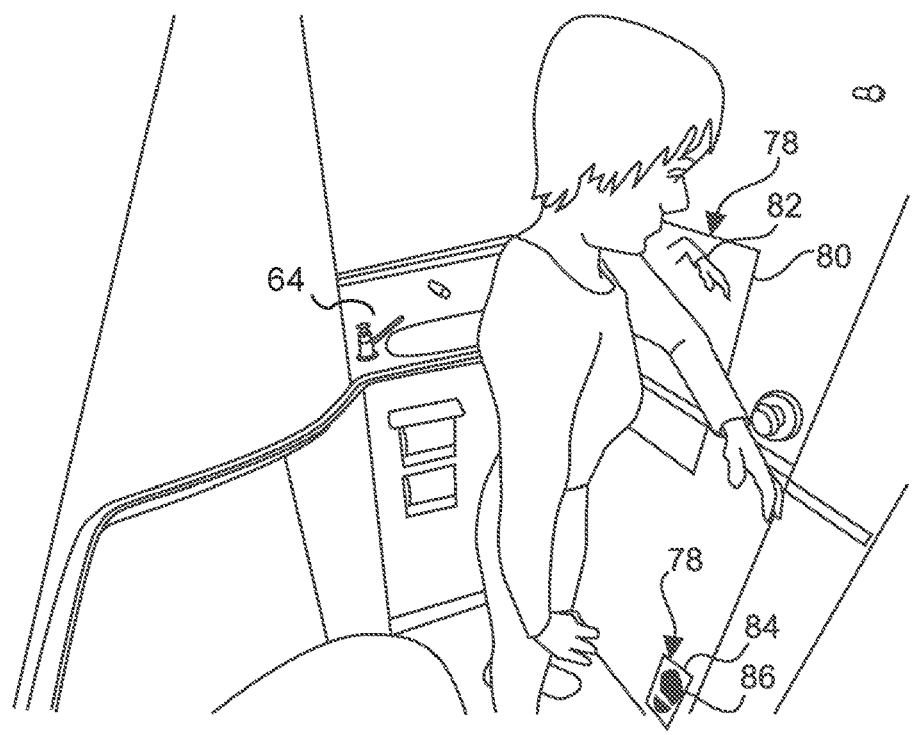
FIG. 5C shows the beginning of the push-open process for example with the elbow, and a perspective view of the FIG. 5B without the person.

FIG. 5B shows that the door element is held in the slightly hinged-out position of the second stage S2. Because of the resulting offset of the door element 12 towards the door frame 14, which offset in FIG. 5B is marked by the arrow 76, the user is informed in a visual manner that the door element can now be pushed open by the user. In FIG. 5C, as a further option, it is shown that push-open regions 78 can be provided on the door element 12, by which push-open regions 78 the user can produce a force for opening the door element 12. The push-open regions are visually distinguished relative to the remaining regions. For example, a shoulder/elbow/forearm contact area 80 is provided in the upper region of the door element, and corresponding pictogram 82 points this out. As an alternative or in addition, a foot contact area 84 is provided in the lower region of the door element, wherein a footprint icon 86 is provided.

After the locking device has been released, the user can push the door open, for example using a foot, elbow or forearm.

Figure 5D:
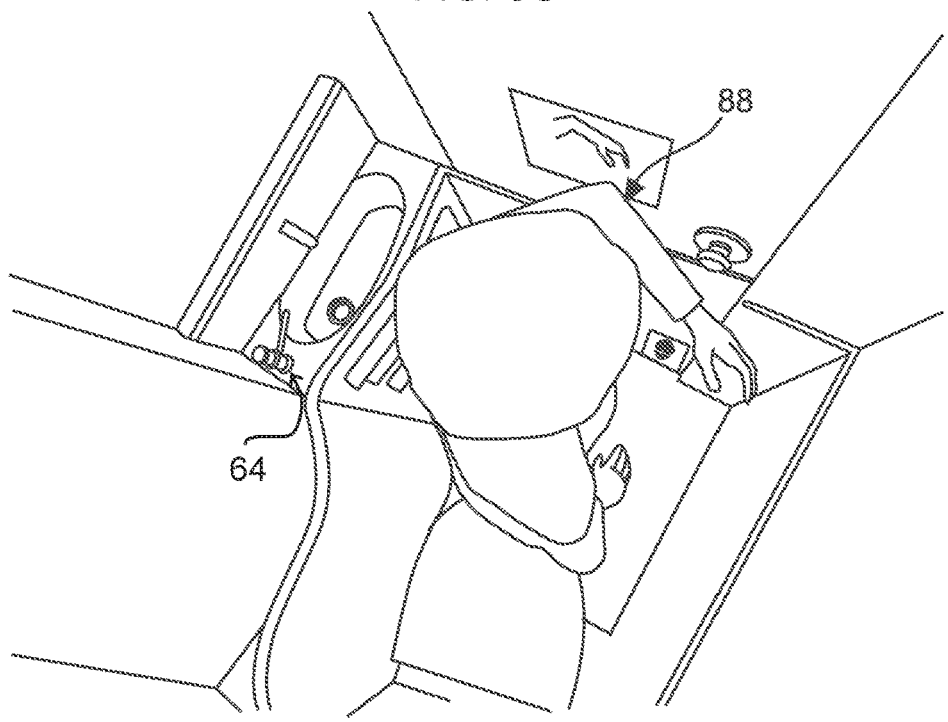
FIG. 5D shows the beginning of the push-open process for example with the elbow, and a perspective view of the FIG. 5B without the person.

FIG. 5D, in a further perspective view from further above onto the person, shows that at this stage users can use elbows 88 to push the door open from the slightly hinged-out position to the open position.

Figure 5E:
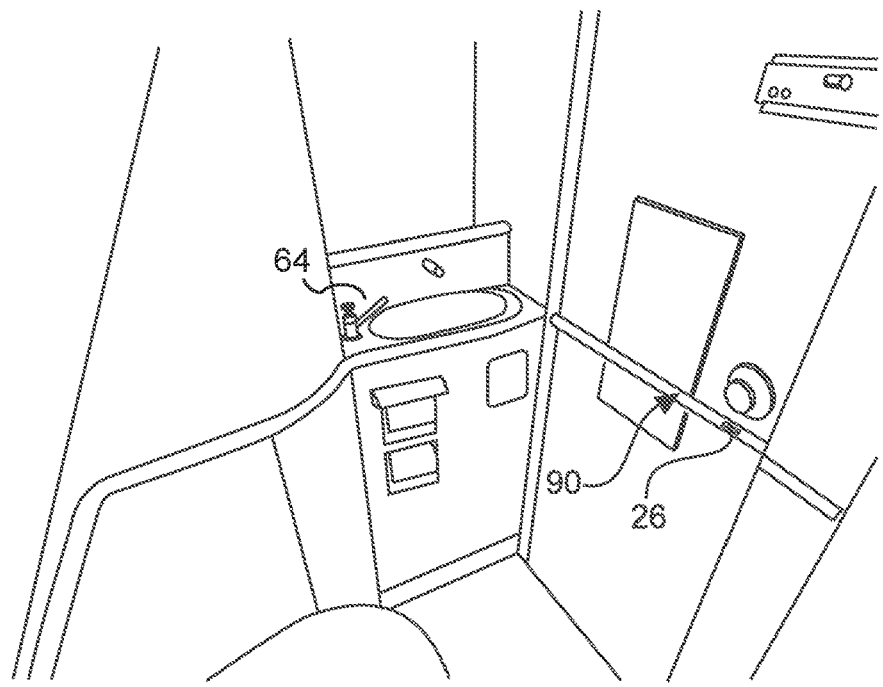
FIG. 5E shows a horizontally extending handrail guidance device as a circumferential handrail.

As a further option, a horizontally extending handrail guidance device 90 can be provided on the door element, and the sensor device 26 has been arranged so as to be integrated in the handrail guidance device. FIG. 5E shows an example, in which the horizontally extending handrail guidance device 90 also continues to other regions, e.g. as a circumferential handrail. For example, all activation surfaces for these functional elements can be arranged in the handrail guidance device.

Figure 6:
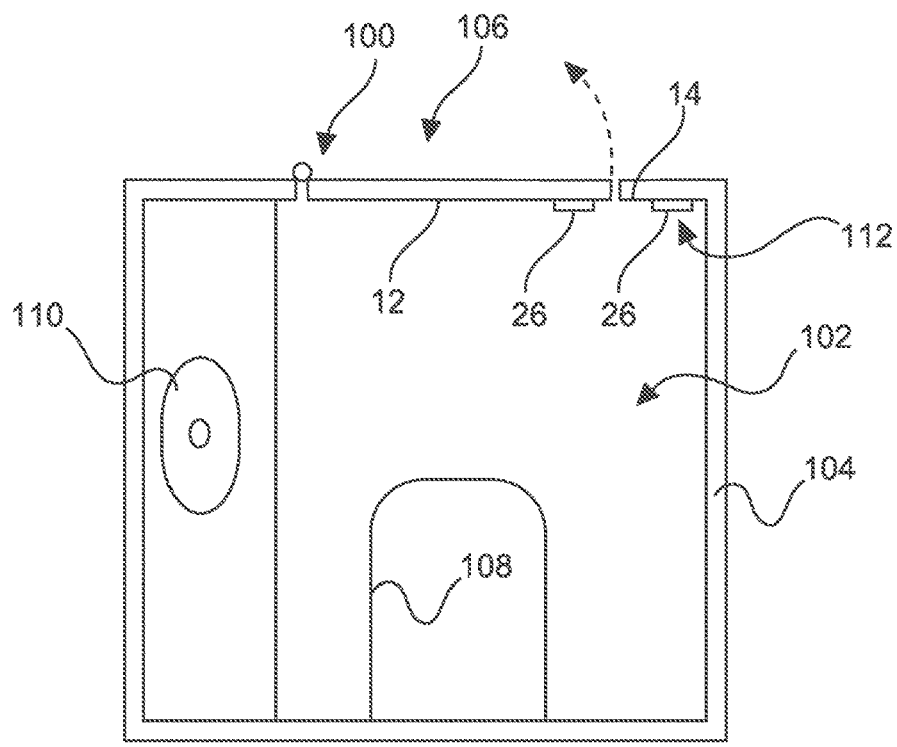
FIG. 6 shows an example of a sanitary unit in a diagrammatic layout or horizontal section.

According to a further example, shown in FIG. 6, a sanitary unit 100 for a cabin of an aircraft is provided, wherein the sanitary unit comprises at least one lavatory facility 102. Furthermore, a wall structure 104 is provided that at least partly encloses the lavatory facility 102. In the wall structure 104 an access door 106 is provided, and inside the lavatory facility 102 a toilet 108 is provided, as also, for example, a wash basin 110. The access door 106 is designed as a door unit according to one of the preceding examples.

As a further option, also shown in FIG. 6, the sensor device 26 can also be arranged on the wall element beside the door element 12, for example in proximity to the door frame 14. The sensor device 26 can, for example, be arranged in the region of an adjoining corner 112 of the lavatory facility 102. In FIG. 6, two possible arrangements of the sensor device 26 are shown together, wherein it is possible for two of the sensor devices 26 to be provided in the two different arrangements together, or for only one of them to be provided.

Figure 7:
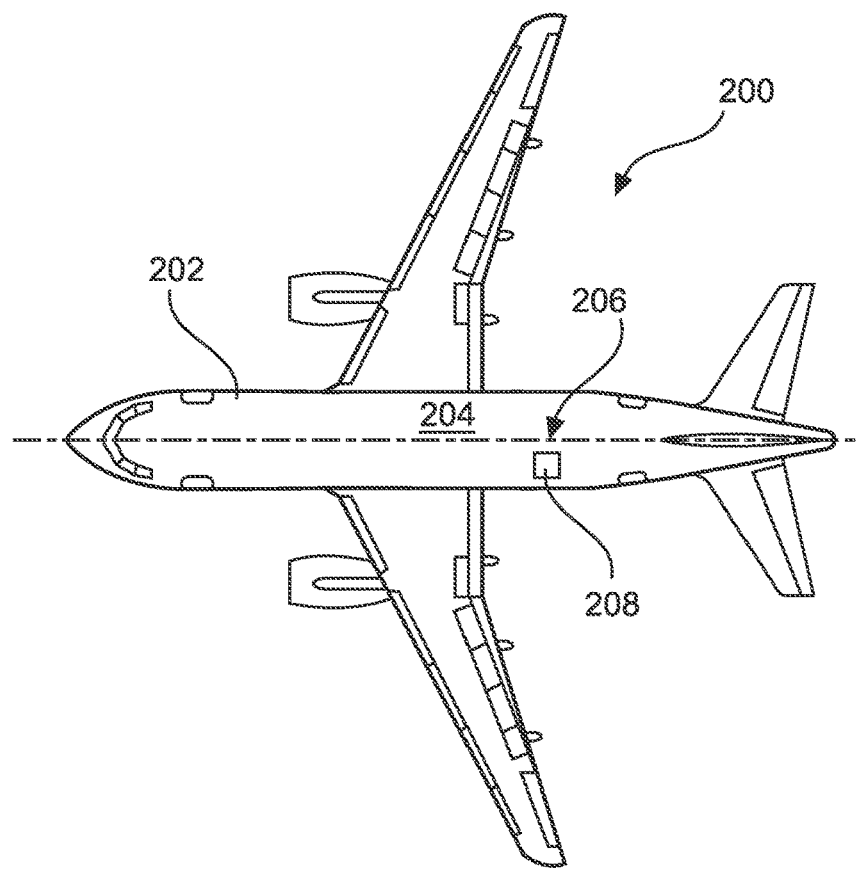
FIG. 7 shows a diagrammatic view of an example of an aircraft.

According to a further example, shown in FIG. 7, an aircraft 200 is provided that comprises a fuselage structure 202 and a cabin region 204 arranged in the fuselage structure 202. The cabin region 204 comprises at least one sanitary area 206 with at least one sanitary unit with a lavatory facility 208. The at least one sanitary unit is designed as a sanitary unit according to the preceding example of FIG. 6.

As indicated in FIG. 7, the aircraft 200 can be an airplane, in particular a passenger airplane. However, the aircraft can also be a helicopter or an airship.

Figure 8:
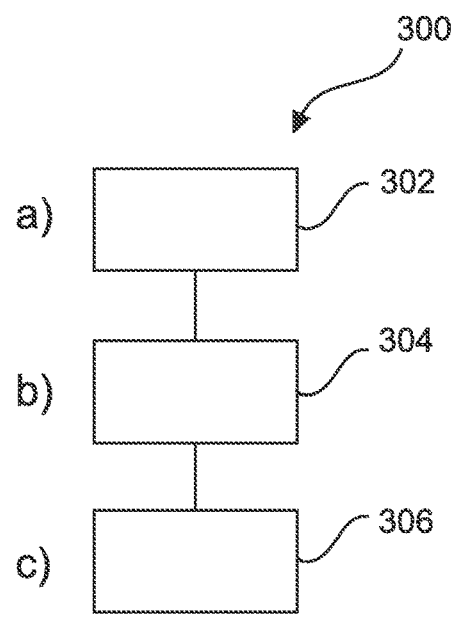
FIG. 8 shows a diagrammatic view of method-related steps of an example of a method for opening a door unit for a lavatory facility in an aircraft.

According to a further embodiment, a method 300 is provided, which is diagrammatically shown in FIG. 8. The method 300 relates to a method for opening a door unit for a lavatory facility, wherein the door unit comprises a door element, a door frame, and a locking and release mechanism. By an articulated device, the door element is movably held on the door frame between an open position and a closed position. The locking and release mechanism comprises a locking device and a release device. By the locking device, the door element can be locked in a closed position in the door frame so that any opening of the door element from outside the lavatory facility is blocked. By the release device, the locking device that is in the locked position can be released so that the door element can be pushed from inside the lavatory facility to the outside. The method 300 comprises the following steps: In a first step 302, also referred to as step a), a non-contacting sensor is activated with a movement of the hand; in a second step 304, also referred to as step b), the release device is activated by the sensor device, and the locking device is released. In a further step 306, also referred to as step c), pushing the door element open takes place by the user.

The exemplary embodiments described above can be combined in different ways. In particular, aspects of the method can also be used for embodiments of the devices and the use of the devices, and vice versa.

In addition, it should be pointed out that "comprising" does not exclude other elements or steps, and "a" or "one" does not exclude a plural number. Furthermore, it should be pointed out that characteristics or steps that have been described with reference to one of the above exemplary embodiments can also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A door unit for a lavatory facility on board an aircraft, comprising:

a door element;
a door frame; and
a locking and release mechanism;
an articulated device for holding the door element on the door frame so as to be movable between an open position and a closed position;
wherein the locking and release mechanism comprises a locking device and a release device;
wherein by the locking device the door element is locked in the closed position in the door frame so that any opening of the door element from outside the lavatory facility is blocked;
wherein by the release device the locking device that is locking the door element in the closed position is released so that from the inside of the lavatory facility the door element will be pushed open to the outside;
wherein for releasing the locking device, the release device comprises a non-contacting sensor device that is activated with a movement of a hand of a user; and
wherein the door element is held in a two-stage manner by the locking and release mechanism:
i) wherein in a first stage the door element is arranged in the closed position in the door frame; and wherein in the first stage the door element is held against opening, with a first retention force; and
ii) wherein in a second stage the door element is held in a slightly hinged-out position with a second retention force; wherein in the slightly hinged-out position, on a side opposite the articulated device, the door element projects from the door frame at least to the extent that the door element is visible from the outside; and wherein in the second stage the door element is configured to be pushed open by the user.

2. The door unit of claim 1,
wherein the slightly hinged-out position is a position of the door element, in which the door projects at least by half of the thickness of a door leaf.

3. The door unit of claim 2, wherein in the slightly hinged-out position the door element is opened to such a degree that a gap is provided between the door leaf and a door frame portion, wherein the gap allows a transmission of light between inside and outside the lavatory; and
wherein, preferably, the gap is not wider than approximately 5 centimeters.

4. The door unit of claim 1, wherein in the closed position the door element is held against a hinge-out force that has been produced as a result of the closing process.

5. The door unit of claim 4, wherein with the locking device released, the hinge-out force causes movement of the door element from the closed position to the slightly hinged-out position, in which the door element is held and in which the door element will be pushed open by the user.

6. The door unit of claim 1, wherein a door closing device is provided, which pushes the door element with a closing force from the open position to the slightly hinged-out position; wherein, for manual opening, the closing force will be overcome by the user.

7. The door unit of claim 1, wherein the sensor device is arranged on the door element in proximity to a door handle.

8. The door unit of claim 1, wherein the sensor device is arranged on a wall element beside the door element.

9. The door unit of claim 1, wherein push-open regions are provided on the door element, to apply a force for opening the door element by the user; and
wherein the push-open regions are visually distinguished relative to the remaining regions.

10. The door unit of claim 1, wherein a horizontally extending handrail guidance device is provided on the door element, and wherein the sensor device is arranged in the handrail guidance device.

11. A sanitary unit for a cabin of an aircraft, wherein the sanitary unit comprises:
at least one lavatory facility;
a wall structure that at least partly encloses the lavatory facility;
an access door in the wall structure; and
a toilet inside the lavatory facility;
wherein the access door is designed as a door unit for a lavatory facility on board an aircraft, and the door unit comprises:
a door element;
a door frame; and
a locking and release mechanism;
an articulated device for holding the door element on the door frame so as to be movable between an open position and a closed position;
wherein the locking and release mechanism comprises a locking device and a release device;
wherein by the locking device the door element is locked in the closed position in the door frame so that any opening of the door element from outside the lavatory facility is blocked;
wherein by the release device the locking device that is locking the door element in the closed position is released so that from the inside of the lavatory facility the door element will be pushed open to the outside;
wherein for releasing the locking device, the release device comprises a non-contacting sensor device that is activated with a movement of a hand of a user; and
wherein the door element is held in a two-stage manner by the locking and release mechanism:
i) wherein in a first stage the door element is arranged in the closed position in the door frame; and wherein in the first stage the door element is held against opening, with a first retention force; and
ii) wherein in a second stage the door element is held in a slightly hinged-out position with a second retention force; wherein in the slightly hinged-out position, on a side opposite the articulated device, the door element projects from the door frame at least to the extent that the door element is visible from the outside; and wherein in the second stage the door element is configured to be pushed open by the user.

12. An aircraft comprising:
a fuselage structure; and
a cabin region arranged in the fuselage structure;
wherein the cabin region comprises at least one sanitary area with at least one sanitary unit with a lavatory facility; and
wherein the at least one sanitary unit is designed as a sanitary unit for a cabin of an aircraft, and the sanitary unit comprises:
at least one lavatory facility;
a wall structure that at least partly encloses the lavatory facility;
an access door in the wall structure; and
a toilet inside the lavatory facility;
wherein the access door is designed as a door unit for a lavatory facility on board an aircraft, and the door unit comprises:
a door element;
a door frame; and
a locking and release mechanism;

an articulated device for holding the door element on the door frame so as to be movable between an open position and a closed position;

wherein the locking and release mechanism comprises a locking device and a release device;

wherein by the locking device the door element is locked in the closed position in the door frame so that any opening of the door element from outside the lavatory facility is blocked;

wherein by the release device the locking device that is locking the door element in the closed position is released so that from the inside of the lavatory facility the door element will be pushed open to the outside;

wherein for releasing the locking device, the release device comprises a non-contacting sensor device that is activated with a movement of a hand of a user; and wherein the door element is held in a two-stage manner by the locking and release mechanism:

i) wherein in a first stage the door element is arranged in the closed position in the door frame; and wherein in the first stage the door element is held against opening, with a first retention force; and ii) wherein in a second stage the door element is held in a slightly hinged-out position with a second retention force; wherein in the slightly hinged-out position, on a side opposite the articulated device, the door element projects from the door frame at least to the extent that the door element is visible from the outside; and wherein in the second stage the door element is configured to be pushed open by the user.

13. A method for opening a door unit for a lavatory facility, with the door unit comprising a door element, a door frame, and a locking and release mechanism; wherein by an articulated device the door element is movably held on the door frame between an open position and a closed position; and wherein the locking and release mechanism comprises a locking device and a release device; and wherein by the locking device the door element is locked in the closed position in the door frame so that any opening of the door element from outside the lavatory facility is blocked; and wherein by the release device the locking device that is in a locked position will be released so that from inside the lavatory facility the door element can be pushed outside; wherein the door element is held in a two-stage manner by the locking and release mechanism: i) wherein in a first stage the door element is arranged in the closed position in the door frame; and wherein in the first stage the door element is held against opening, with a first retention force; and ii) wherein in a second stage the door element is held in a slightly hinged-out position with a second retention force; wherein in the slightly hinged-out position, on a side opposite the articulated device, the door element projects from the door frame at least to the extent that the door element is visible from the outside; and wherein in the second stage the door element is configured to be pushed open by a user; and wherein the method comprises:

a) activating a non-contacting sensor device with a movement of a hand of the user;

b) activating the release device and releasing the locking device; and c) pushing the door element open by the user.

14. A door unit for a lavatory facility on board an aircraft, comprising:

a door element;

a door frame;

a locking and release mechanism;

an articulated device for holding the door element on the door frame so as to be movable between an open position and a closed position;

wherein the locking and release mechanism comprises a locking device and a release device;

wherein by the locking device the door element is locked in the closed position in the door frame so that any opening of the door element from outside the lavatory facility is blocked;

wherein by the release device the locking device that is locking the door element in the closed position is released so that from the inside of the lavatory facility the door element is configured to be pushed open to the outside;

wherein for releasing the locking device, the release device comprises a non-contacting sensor device that is activated with a movement of a hand of a user; and wherein the door element is held in a two-stage manner by the locking and release mechanism:

i) wherein in a first stage the door element is arranged in the closed position in the door frame; and wherein in the first stage the door element is held against opening, with a first retention force; and ii) wherein in a second stage the door element is held in a slightly hinged-out position with a second retention force; wherein in the slightly hinged-out position, on a side opposite the articulated device, the door element projects from the door frame at least to the extent that the door element is visible from the outside; and wherein in the second stage the door element is configured to be pushed open by the user;

wherein in the closed position the door element is held against a hinge-out force that has been produced as a result of the closing process; and wherein with the locking device released, the hinge-out force causes movement of the door element from the closed position to the slightly hinged-out position, in which the door element is held and in which the door element is configured to be pushed open by the user.

* * * * *